United States Patent [19]

Rossi

[11] 3,846,785

[45] Nov. 5, 1974

[54] PROCESS AND APPARATUS FOR EXTENDING THE RANGE OF A DIGITAL TO ANALOG CONVERTER TO BE USED WITH A STRIP RECORDER

[76] Inventor: Armando Rossi, Corso Giambone 68, Turin, Italy

[22] Filed: Aug. 21, 1972

[21] Appl. No.: 282,458

[30] Foreign Application Priority Data

Nov. 24, 1971 Italy .................................. 70843/71

[52] U.S. Cl. .............................. 340/347 DA, 346/65

[51] Int. Cl. ........................ H03k 13/243, G01d 9/02

[58] Field of Search ...................... 346/5, 14, 65, 23; 340/347 DA; 235/154, 197

[56] References Cited

UNITED STATES PATENTS 1,784,522 12/1930 Harrison .............................. 346/65

2,661,260 12/1953 Salzman ............................... 346/65

3,465,359 9/1969 Hackley ................................ 346/23

*Primary Examiner*—Malcolm A. Morrison

[57] ABSTRACT

A process for adding a zones at the ends of the range in digital-analog converters intended for use in connection with recorders writing on a strip, wherein the data to be sent to said converter are modified so as to comprise within a single excursion of the writing member also some values expressed by the digit immediately preceding the digits used by the converter. Preferably said modification is achieved by decoding said data, coding them again in an excess one code and introducing in said excess one code two variants in correspondence with the ends of the range of the converter. The invention provides also a device for carrying out said method, consisting of a group of logic devices, preferably NAND gates in positive logic and inverters connected so as to form a code converter, and of a sequential network apt to recognize the transition in either direction, from the digit before the scale end to the scale end digit and to introduce in said code converter the variants provided for said scale end digits. The device also comprises a logic circuit connected to the sequential network and allowing to change the width of the added zones.

8 Claims, 9 Drawing Figures

PROCESS AND APPARATUS FOR EXTENDING THE RANGE OF A DIGITAL TO ANALOG CONVERTER TO BE USED WITH A STRIP RECORDER

The present invention relates to a process and a device for adding a extension zones at the ends of the range of digital-analog converters to be used with recorders writing on a strip.

As known, in order to draw directly the diagram of a quantity measured by a digital device, whose characteristic is of giving the digital indication of the measured quantity, in a certain code, the use of a digital-analog converter is required in order to convert the data from the measuring member into an analog quantity apt to drive a recording means writing on a strip.

Normally not all digits provided by the measuring member are used for the recording, but only some consecutive digits, for instance the less significant digits, and this allows to have a great resolution in the recording. Due to this fact, when the digit immediately before the recorded digits changes by a unit, the writing means abruptly passes from the lower scale end to the upper scale end or vice versa, so that the recording is broken in several tracts. Moreover, when an almost constant quantity is measured whose value is near a scale end and is subjected only to small fluctuations about said scale end, the writing means would be caused to pass continuously from one scale end to the other, whereby the recording is difficult and sometime impossible to read.

Therefore it is the object of the invention to provide a process and a device which allow to obtain a meaningful recording of the value of a quantity also when such a value oscillates about the ends of the range of the digital-analog converter used in connection with the recorder.

The process according to the invention is characterized in that the data which are to be sent to the digital-analog converter are modified so that also some values expressed by the digit immediately before the digits used by the converter lie within a single excursion of the writing means of the recorder.

Advantageously, if a recording based on an interval corresponding to ten digits is used, the modification consists in that said interval is completed by one unit, or a fraction of a unit, before the digit zero, and by one unit, or a fraction of a unit, past the digit ten.

The circuit realizing said process is characterized in that it has logic means connected to one another so as to form a code converter, followed by a device apt to introduce two changes in said converter in correspondence with the ends of the recording range, the introduction of said changes being realized by a sequential circuit which detects the passages, in either direction, from the penultimate to the last digit expressed by the code.

Preferably the circuit according to the invention consists of a number of NAND gates which decode the input digits and are connected to other gates which provide a new output by coding again said digits in the same code with excess one, and introduce the changes relating to the extreme digits by order of a sequential network consisting of a bistable preceded by two memory circuits and by a NAND logic.

If the recording range corresponds to ten digits (0, 1, ... 9) the changes in the output code consist in providing for digits 0 and 9 outputs corresponding to values 11 and 0 respectively.

According to another preferred feature of the invention, the device for inserting the extensions is connected to a circuit which allows to change the width of the introduced extended zones.

The invention will become more apparent from the following description, with reference to the accompanying drawings, in which.

The invention and its operation will now be described by supposing that the recorder provides a trace of the behavior of the digits of the units of the value of the measured quantity; the recorder scale (before it is modified according to the invention) will then lie between 0 and 10. It is also supposed that the hysteresis zone introduced at both ends may have a width either of one unit or of two-tenths of a unit.

Figure 1:
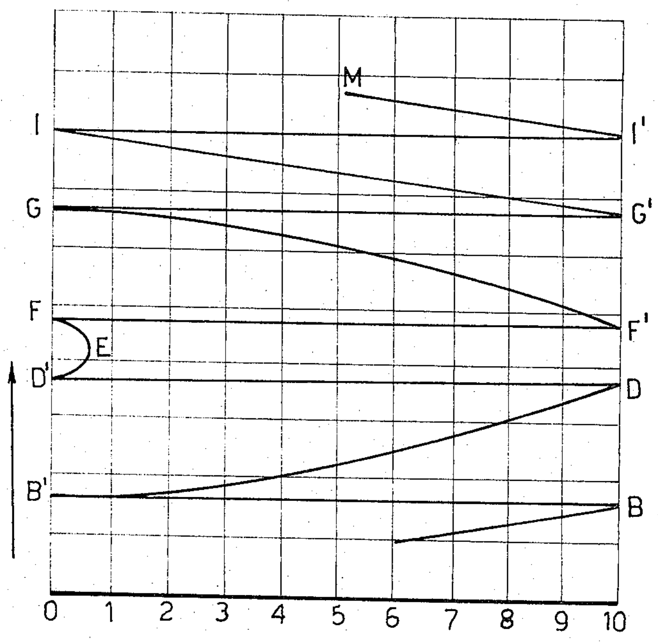
FIG. 1 is the diagram of the behaviour of the trace of a recording according to the known technique.

Referring now to FIG. 1, there is shown the behavior of a recording obtained without employing the invention; the lower portion of the recording (broken line ABB'DD'E) relates to a quantity with increasing value, whereas the upper portion (broken line EFF'GG'11'M) relates to a decreasing quantity. The Figure shows that, whenever the digit immediately preceding that recorded changes by one unit, the nib of the recorder passes abruptly from one scale end to the other.

Figure 2:
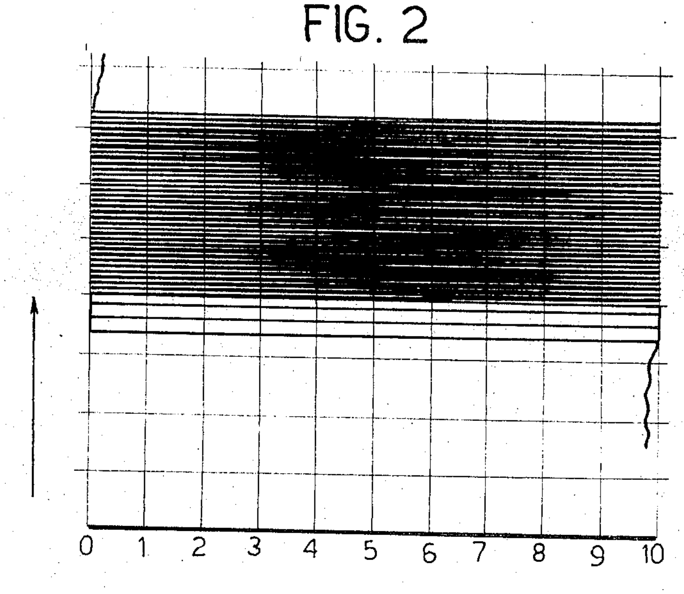
FIG. 2 shows a diagram similar to that of FIG. 1 and relating to a quantity subjected to small changes with respect to the scale end value.

If the measured value, reaching a point near the scale end, for instance point B, instead of varying always in the same way, becomes subjected only to small oscillations about said scale end, the writing nib should pass twice from one end to the other at each fluctuation of the quantity and, if the frequency of the oscillations is high with respect to the sliding speed of the tape or strip, the dense succession of passages from one scale end to the other would render the recording unemployable. This case is shown in FIG. 2.

Figure 3:
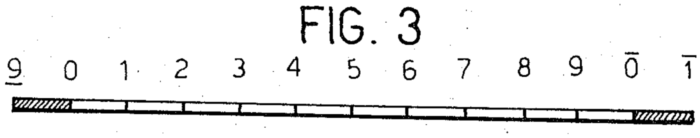
FIG. 3 is the diagram of the scale of a recorder according to the invention.

FIG. 3 shows the scale of a recorder extended by adding a further interval both at the left of the zero (interval $\underline{\mathbf{9}}$ – 0) and at the right of the 10 (interval $\overline{\mathbf{0}}$ – $\overline{\mathbf{1}}$). As shown, the scale has two zones defined by digits 9 and 1, and the position of the writing point depends also upon the digit immediately before the more significant digit used by the converter, besides depending upon said more significant digit.

Figure 4:
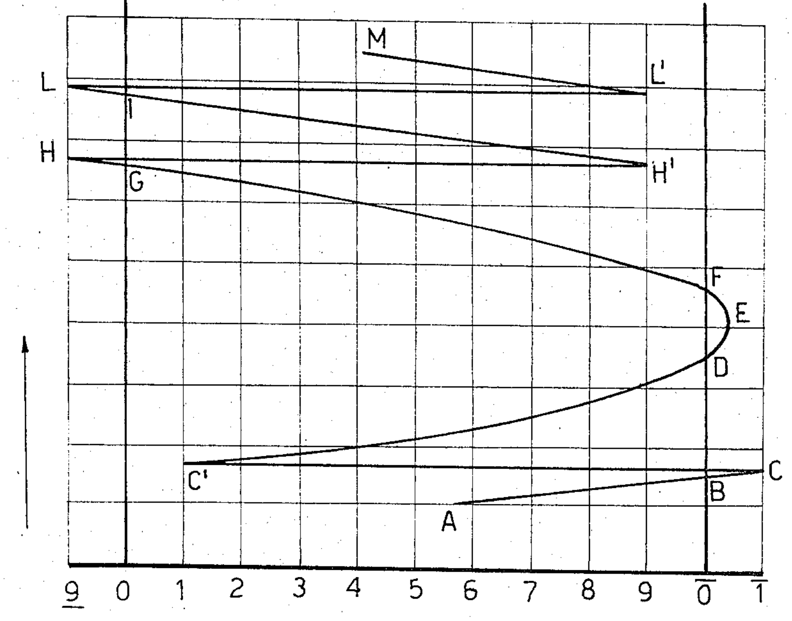
FIG. 4 is similar to FIG. 1, and shows the shape of the recording when the invention is used.

FIG. 4 shows a recording obtained by using an extended scale such as that of FIG. 3. As shown, as the quantity increases, the writing nib, after having reached mark $\overline{0}$ (points B and D) still moves in the same direction and the abrupt passage from one scale end to the other occurs only when mark $\overline{1}$ (point C) is reached. If limit $\overline{1}$ is not reached (point E), the recording continues in faithfully reproducing the behavior of the quantity. The same fact occurs at the other scale end: the writing nib, as the quantity decreases, records values under the 0 (points G and I) and will pass from one scale end to the other only when the lower limit $\underline{9}$ is reached.

Figure 5:
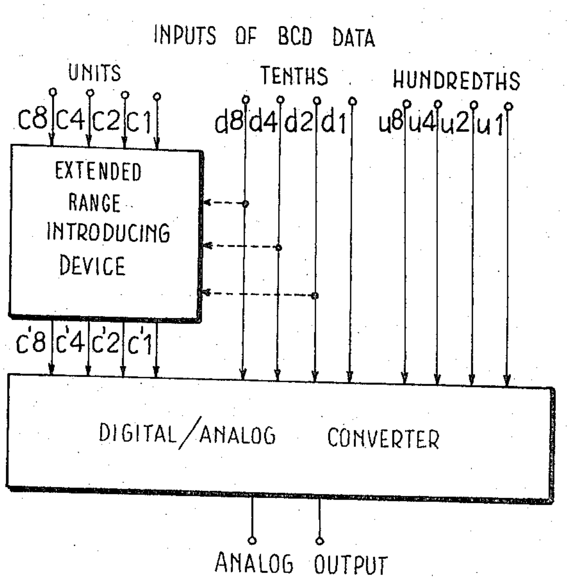
FIG. 5 is a block diagram of the connections of the device according to the invention.

The device which allows to extend the scale, i.e. to add a extension zones at the scale ends, is connected to the input of the data relating to the unit digits of a conventional three digit digital-analog converter, operating for instance with a parallel BCD 8 4 2 1 code. The block diagram of such a device is shown in FIG. 5.

In this Figure $c_1$, $c_2$, $c_4$, $c_8$ are the inputs for the unit digits before they pass into the hysteresis inserting device, and $c'_1$, $c'_2$, $c'_4$, $c'_8$ are the outputs from said device to the converter. Also the converter inputs relating to the digits of the tenths ($d_1$ ... $d_8$) and to the digits of the hundredths ($u_1$ ... $u_8$) are shown. A connection, shown in dashed lines in FIG. 5, is realized between the inputs for the tenths and the extensions inserting device and said connection is used when it is desired to insert a extension zones whose width is of one or more tenths.

Figure 6:
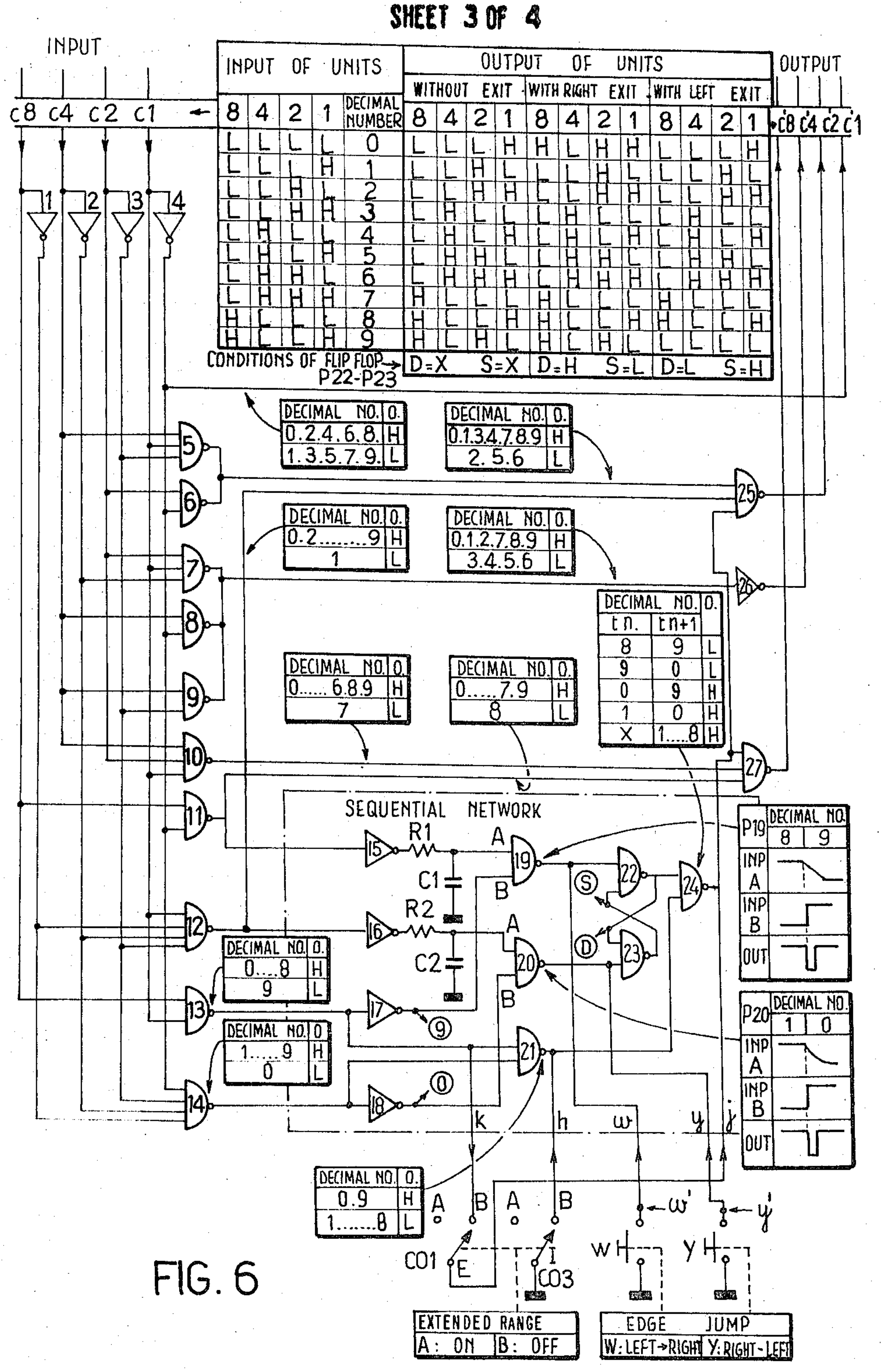
FIG. 6 is the electrical diagram of a preferred embodiment of the invention.

A preferred embodiment of the circuits which form the device according to the invention is shown in FIG. 6.

As shown, such a device consists of a network of microcircuits acting as NAND gates in positive logic and of inverters, and it may be considered as formed by two parts, namely a combination network which converts the input code into an excess one code, and a sequential network which introduces two variants in the excess one code in correspondence with the decimal digits 0 and 9.

As shown in the Figure the inputs $c_1$ ... $c_8$ are fed, directly or through inverters 1, 2, 3, 4, to a group of NAND gates shown by reference numerals 5 to 14. The output from inverter 4 forms also output c'1 from the device.

More particularly gate 5 has two inputs connected to inputs $c_1$ and $c_4$ respectively, and a third input which receives input $c_2$ inverted by inverter 3. Gate 6 is fed at a first input by the signal present on $c_2$ and at a second input by the signal present on $c_1$ inverted by inverter 4. These two gates have a common output which forms a first input of a further NAND 25 whose output forms output $c'_2$ of the device.

Gate 7 has three inputs respectively connected to $c_2$, $c_1$ and to the output of inverter 2 which inverts the signal present on $c_4$. Gate 8 is fed at its two inputs by the signal of $c_4$ and respectively by the signal of $c_1$ inverted by inverter 4. Gate 9, also with two inputs, receives the direct signal of $c_4$ and the inverted signal of $c_2$. Gates 7, 8, 9 have a common output which, inverted by a further inverter 26, forms output $c'_4$ of the device.

Gate 10 has three inputs to which the signals from $c_4$, $c_2$ and $c_1$ are fed; the output of said gate is fed to an input of a NAND 27 whose output forms output $c'_8$ of the device.

Gate 11 has two inputs fed by the signal of $c_8$ and by the output of inverter 4 respectively; its output is sent to a second input of NAND 27 and to an inverter 15 whose output is connected, through resistor $R_1$ and the grounded capacitor $C_1$, to an input of NAND 19 whose output forms a first input of a bistable circuit consisting of NAND gates 22, 23. The output from NAND 22 is connected, through a NAND 24, to further inputs of NAND gates 25 and 27. The bistable 22, 23 is also connected to a device for varying the width of the hysteresis zone (outputs S and D).

Gate 12 has four inputs, respectively connected to $c_1$ and to the outputs of inverters 1, 2, 3, and its output is connected to a third input of NAND 25 and to the input of an inverter 16 which is connected through resistor $R_2$ and capacitor $C_2$ to the input A of a NAND 20 whose output is connected to NAND 23.

Gate 13 receives at its two inputs the signals from $c_1$ and $c_8$ and is apt to decode digit 9; its output is connected to an inverter 17 whose output is connected to the second input of NAND 19. The output of NAND 13 is also connected to the second input of NAND 24 through a NAND 21.

Lastly gate 14 receives at its inputs the outputs from inverters 1 to 4, and is apt to decode digit 0; its output is connected to the second input of NAND 21 and, through an inverter 18, to the second input of NAND 20.

Also the outputs of inverters 17 and 18 are connected to the device for varying the width of the extended zones (arrows 0 and 9).

The circuit portion between the inputs of inverters 15 to 18 and the output from gate 24 forms the sequential network which introduces the variants in the code.

The circuit diagram shows also that two two-way switches $CO_1$, $CO_3$, ridigly connected to each other, are provided; the two positions A, B of said switches correspond to "introduced extensions" and "excluded extensions" respectively. Contact E of $CO_1$ is connected to the output of gate 24 by wire $j$, and contact B of $CO_1$ is connected to the first input of NAND 21 by wire $k$, the output of NAND 21 being also connected to contact B of $CO_3$.

Two switches W and Y are also provided, connected as shown by $w$ and $y$ to the inputs of bistable 22, 23, and said switches allow to operate the bistable for manually displacing the writing member of the recorder from zone $\underline{9}$ – 1 to zone 9 – $\overline{1}$ and vice-versa.

The described device allows to introduce an extension zone having a width of one unit: such a width is optimum in respect of the device simplification, but it requires the use of a strip divided into 12 equal parts (FIG. 3).

Since practically a less wide extension zones, having a width for instance of two-tenths of a space, may be very often sufficient, the circuit may be completed by a device allowing to pass from one width to the other; the use of a narrower extension zone allows to employ a normal strip divided in ten parts, by using also the edges.

Such a device (FIG. 7) is connected in the converter inputs relating to the data of the digits of tenths, and is also connected by one side to bistable 22, 23 of FIG. 6, (connections S and D) to the outputs of inverters 17, 18 (connections 0, 9) and by the other side (connections $w'$ and $y'$) to inputs $w$ and $y$ of bistable 22, 23.

More particularly inverters 28, 29, 30 are connected in the inputs $d_2$, $d_4$, $d_8$ relating to the digits of tenths: the outputs of said inverters are connected to a NAND 34, whose output forms one of the inputs of a NAND 38, whose output is in turn connected to the main circuit by means of connection $y'$. The output of NAND 34 is also grounded through a capacitor $C_4$.

The outputs of inverters 28 and 29 form also two inputs of a NAND 32, whereof a third input is connected to the input of inverter 30. The output of NAND 32 is also grounded through a capacitor $C_3$ and is connected to the main circuit (connection $w'$) through a NAND 37, whereof a second input is connected to a second input of NAND 38. The common input of NAND gates 37, 38 is also connected to a two-way switch $CO_2$ which allows to choose either of two values of the width of the extension zone, for instance two-tenths or ten-tenths.

A third input of each of NAND gates 37, 38 is also connected to the main circuit through an inverter 35 and a NAND 31 receiving output S of bistable 22, 23 and output 9 of inverter 17 (NAND 37) and respectively (NAND 38) through an inverter 36 and a NAND 33 receiving output D of bistable 22, 23 and output 0 of the inverter 18.

Figure 7:
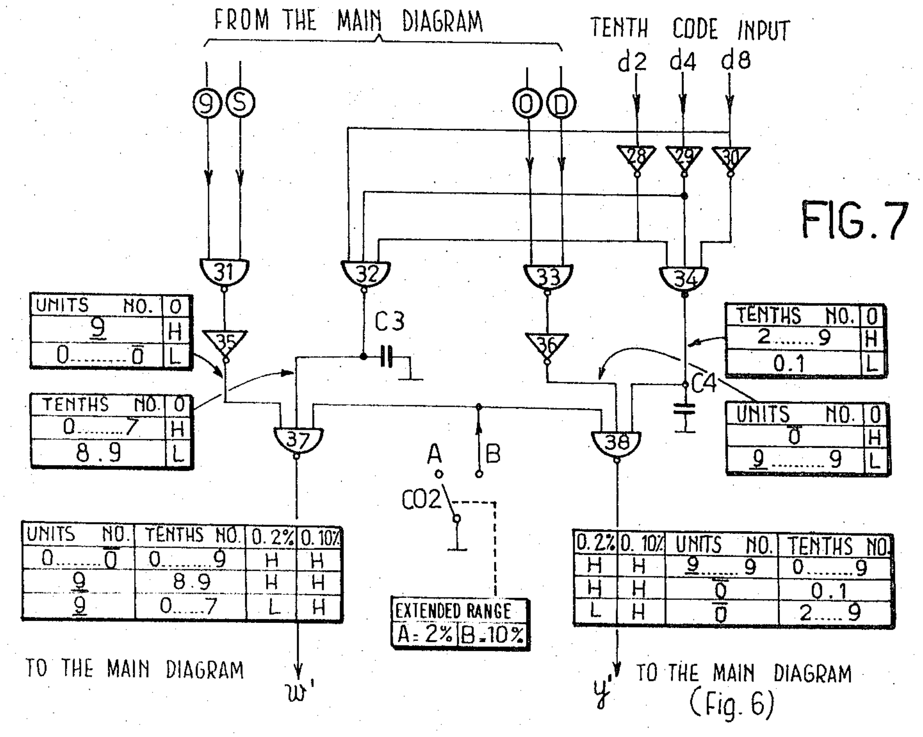
FIG. 7 is the diagram of a further device allowing to change the width of the extended zone.
Figure 8:
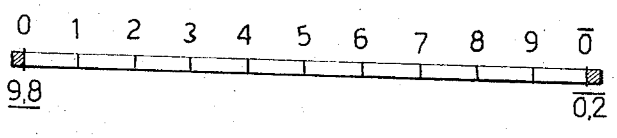
FIG. 8 is similar to FIG. 3 and shows a scale of the recorder with a reduced extended zone.

The recorder scale with a 2 % extension obtained by the circuit of FIG. 7 is shown in FIG. 8.

Figure 9:
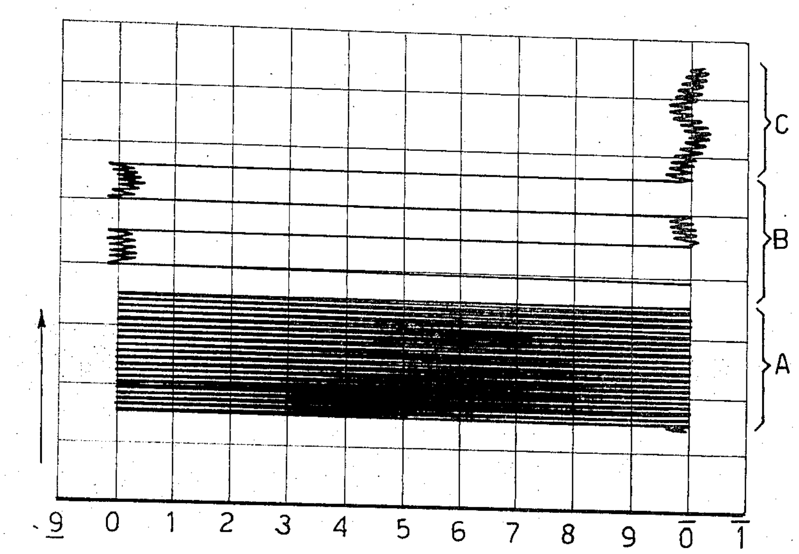
FIG. 9 is similar to FIG. 2 and shows a recording obtained without the invention and with two differently wide extended zones.

Lastly FIG. 9 shows an exemplary recording divided into three portions, whereof the one marked by A is obtained without employing the invention, the one marked by B is obtained with a two-tenth extension, and the one marked by C is obtained by a one unit extension: as shown in the drawing, the returns which made recording A unreadable have almost wholly disappeared in portion B and have been wholly eliminated in portion C.

The described device operates in the following way. The circuit shown in FIG. 6 may be divided into a combination network which converts the input binary code into an excess one code, and a sequential network which introduces two variants in said excess one code in correspondence with decimal digits 0 and 9. Said variants, as shown in the tables accompanying FIG. 6, concern outputs $c'_8$ and $c'_2$ of the device, and depend upon the state of gate 24 controlled by bistable 22, 23. All data relating to digits other than 0 and 9 are not affected since gate 24 is inhibited by gate 21. In said tables "H" and "L" denote respectively the high level and the low level corresponding to states "1" and "0" of the binary code; "X" denote an indifferent state.

The operation may be illustrated with an example by considering the weight of the bits of the input and output codes.

Let be supposed that an increasing quantity is to be measured and that the unit input has value 8: then the output will have value 9 (8 + 1), since gate 24 is blocked by gate 21 which in turn is held blocked, for all digits from 1 to 8 included, by gates 13 and 14 decoding digits 9 and 0.

When the unit input reaches value 9, gate 21 releases gate 24 allowing the bistable 22, 23 to intervene. At the same time the decoding of digit 9 carried out by NAND gate 13 brings to H level input B of gate 19 still having on input A, due to the delay introduced by capacitor $C_1$, the H level generated by the decoding of digit 8 carried out by gate 11 and inverted by inverter 15. For a short instant the output of NAND 19 passes to a L level and operates bistable 22, 23 which brings to L level gate 24 thereby inhibiting gates 25, 27, whereby the output code detects a FIG. 10 which after being converted causes the writing nib to take position 9 on the scale shown in FIG. 3.

If the measured quantity further increases, the unused digit preceding the unit digit changes, while the unit digits become 0. In such conditions bistable 22, 23 still holds at a L level the output of NAND 24, so that the output of device has value 11 (see tables) and the first variant to the code is thus introduced. The converter, detecting output 11, causes the recorder to take position $\bar{0}$ on the scale of FIG. 3. For a further increase, the unit digit becomes 1, and the output of gate 14 becomes H: gate 21 is again inhibited and inhibits gate 24 independently of the state of bistable 22, 23. When gate 24 is inhibited, its output is at H level and the coded output becomes 2: at this point the writing nib carries out the transition, which, with a conventional device, would have already occurred when position $\bar{0}$ had been reached on the scale. Due to such a transition the writing member reaches position 1. For subsequent increases gate 24 is always inhibited, until digit 9 is reached again, and the output is equal to the input code increased by one unit.

If a decrease of the quantity would occur instead of a further increase, when the value becomes 0, NAND 14 through gate 21 releases gate 24 whose output is however kept H by the bistable; this one will change its state due to a short negative pulse provided at the output of gate 20 by capacitor $C_2$ when the passage from 1 to 0 occurs. In such conditions input 0 provides output 1.

A further decrease to value 9 doesn't change the output of gate 24 which is inhibited by the bistable and input 9 is converted into 0: the writing member of the recorder takes then position $\underline{9}$ on the scale. A further decrease causes a transition to occur and the writing member takes position 8.

If the quantity begins to decrease before position $\bar{1}$ is reached the first transition would not have occurred.

The transition from one scale end to the other can slso be obtained by manually operating bistable 22, 23 by means of push-buttons W and Y, so as respectively to bring the writing nib from zone $\underline{9}$ – 1 to zone 9 – $\bar{1}$ and vice-versa.

If it is desired to change the width of the extension zone, for instance so as to have a 2 % extension, the circuit of FIG. 7 is inserted by bringing switch $CO_2$ to position A.

The circuit of FIG. 7 operates as follows: NAND gate 32 is connected to the input circuits for the tenths so as to detect digits 8 and 9 and to provide in correspondence of said digits an output at L level, and NAND gate 34 is connected so as to provide an output at L level when digits 0 and 1 of the tenths are present at the input.

If the measured quantity decreases under zero, NAND 31 has its output at L level since the output of bistable 22, 23 is at level H as well as the inverted output of NAND 13 decoding the unit digit 9. As long as the quantity has a value within the range $\underline{9}$, $\underline{8}$ – 0, NAND 37 has its inputs at different levels and is inhibited. As soon as digit 8 is got over when the quantity decreases, the output of NAND 32 passes to H level: in this case the output of NAND 37 is at L level and, when applied to input $w$ of bistable 22, 23, causes the state thereof to change whereby the writing nib is displaced and reaches position 9, 7.

If on the contrary the quantity is increasing, if the value thereof is in the range between $\bar{0}$ and $\bar{0},\bar{2}$, gate 38 is inhibited since its input connected to the gate decoding the 0 of the units is at H level and its input connected to the gate decoding the tenths is at L level, so that the nib moves normally. When value $\bar{0}$, $\bar{2}$ is reached, the input connected to NAND 34 decoding the tenths takes a H level, thereby releasing gate 38 whose output, fed to input *y* of the bistable, causes said bistable to change its state, whereby the writing nib passes to the opposite edge of the strip taking position 0, 3.

It is to be understood that the above description is given only by way of a non limiting example, and that changes and modifications can be introduced, particularly in the width of the extension zone, without departing from the scope of the present invention.

What I claim is:

1. In a recording system comprising a digital to analog converter which receives binary coded decimal (BCD) signals representing a quantity being measured and applies one decimal digit of the quantity to a strip recorder which utilizes a recording medium having a decimal amplitude scale, the process for extending the amplitude range of the strip recorder by adding zones to the ends of the scale, comprising the steps of:

a. encoding the BCD signals into a further code having an amplitude range greater than the BCD range;

b. detecting the BCD value of zero in the digit being recorded;

c. detecting the direction of change of the quantity being measured;

d. encoding a BCD zero from the digit into a number in said further code whose amplitude is greater than the encoded value of BCD 9, when the quantity is increasing in value, and encoding a BCD zero from the digit into a number in said further code whose amplitude is less than the encoded value of BCD 1, when the quantity is decreasing in value; and e. providing a scale transition signal for the digit being recorded at a value increasing from BCD zero when the quantity is increasing, and providing a scale transition signal for the digit being recorded at a value decreasing from BCD zero when the quantity is decreasing.

2. A process as in claim 1 and wherein said further code is an excess one code.

3. A process as in claim 1 and wherein the scale transition signals occurs at an integral number higher and lower than zero for the digit being recorded.

4. A process as in claim 1 and further comprising the steps of:

f. detecting at least some of the BCD signals of the next lower digit of the quantity being measured;

g. combining the BCD signals detected from the next lower digit with the BCD signals of the digit being recorded, only when the BCD signals of the digit being recorded increases and decreases from BCD zone; and h. utilizing the combined signals to form the scale transition signals at a fractional number higher and lower than the BCD zero for the digit being recorded.

5. In a recording system comprising a digital to analog converter which is responsive to binary coded decimal (BCD) signals representing a quantity being measured and applying one decimal digit of the quantity to a strip recorder which has a recording medium with a decimal amplitude scale; apparatus connected to the input of the digital to analog converter for extending the amplitude range by adding zones to the ends of the scale, comprising:

a. means for encoding the BCD signals into a further code having an amplitude range greater than the BCD range;

b. selecting means connected to the BCD signals for detecting the BCD value of zero;

c. detecting means connected to the BCD signals and producing a first signal responsive to a change in the BCD values from 8 to 9 and producing a second signal response to a change in the BCD values from 1 to 0;

d. memory means responsive to said detecting means for storing said first and second signals;

e. logic means controlled by said selecting means and said memory means and controlling said encoding means for encoding a BCD zero into a number whose amplitude is greater than the encoded value of BCD 9, when said memory means stores said first signal, and for encoding a BCD zero into a number whose amplitude is less than the encoded value of BCD 1, when said memory means stores said second signal, and f. control means for disconnecting said logic means from said encoding means following a predetermined value of the quantity increasing from the BCD zero when the quantity is increasing and decreasing from the BCD zero when the quantity is decreasing.

6. Apparatus as in claim 5 and wherein said further code is an excess one code.

7. Apparatus as in claim 5 and wherein said predetermined value is an integral number.

8. Apparatus as in claim 5 and further comprising:

g. additional detecting means for detecting at least some of the BCD signals of the next lower digit of the quantity being measured; and h. combining means connected to said additional detecting means and said selecting means for forming a control signal when the value of the quantity increases above and decreases below the BCD zero detected by the value detected by the additional detecting means, said control signal operating said control means.

* * * * *